(12) United States Patent
Trainoff

(10) Patent No.: US 11,644,446 B2
(45) Date of Patent: May 9, 2023

(54) INJECTING A LIQUID BORNE SAMPLE INTO A FIELD FLOW FRACTIONATOR

(71) Applicant: Wyatt Technology Corporation, Goleta, CA (US)

(72) Inventor: Steven P. Trainoff, Santa Barbara, CA (US)

(73) Assignee: WYATT TECHNOLOGY CORPORATION, Goleta, CA (US)

( * ) Notice: Subject to any disclaimer, the term of this patent is extended or adjusted under 35 U.S.C. 154(b) by 798 days.

(21) Appl. No.: 16/492,570

(22) PCT Filed: Mar. 9, 2018

(86) PCT No.: PCT/US2018/021875
§ 371 (c)(1),
(2) Date: Sep. 9, 2019

(87) PCT Pub. No.: WO2018/165627
PCT Pub. Date: Sep. 13, 2018

(65) Prior Publication Data
US 2020/0049671 A1 Feb. 13, 2020

Related U.S. Application Data

(60) Provisional application No. 62/469,403, filed on Mar. 9, 2017.

(51) Int. Cl.
*G01N 30/00* (2006.01)
*B01D 57/02* (2006.01)
(Continued)

(52) U.S. Cl.
CPC ......... *G01N 30/0005* (2013.01); *B01D 57/02* (2013.01); *B01D 63/087* (2013.01);
(Continued)

(58) Field of Classification Search
CPC .................. G01N 2030/001; G01N 2030/002
See application file for complete search history.

(56) References Cited

U.S. PATENT DOCUMENTS

| 5,141,651 A * | 8/1992 | Giddings .......... B01L 3/502753 210/243 |
| 2004/0000519 A1* | 1/2004 | Jiang .................. G01N 30/0005 210/656 |

(Continued)

*Primary Examiner* — Daniel S Larkin
(74) *Attorney, Agent, or Firm* — Leonard T. Guzman

(57) ABSTRACT

The present invention an apparatus and method of injecting a liquid borne sample into a field flow fractionator and a method of forming a top plate and spacer. In an embodiment, the field flow fractionation unit includes a top plate including a sample injection inlet port, a sample injection outlet port, and a spacer including a separation channel cavity defining at least a portion of the separation channel, a sample injection inlet cavity configured to be in fluid contact with the separation channel and located substantially beneath the sample injection inlet port, a sample injection outlet cavity configured to be in fluid contact with the separation channel and located substantially beneath the sample injection outlet port, such that the injection inlet and outlet paths are configured to define an injection channel that is essentially perpendicular to the length of the separation channel spanning the width of the separation channel cavity.

14 Claims, 15 Drawing Sheets

(51) Int. Cl.
*B01D 63/08* (2006.01)
*B03C 5/02* (2006.01)
(52) U.S. Cl.
CPC .............. *B01D 63/088* (2013.01); *B03C 5/02* (2013.01); *G01N 2030/001* (2013.01); *G01N 2030/002* (2013.01)

(56) References Cited

U.S. PATENT DOCUMENTS

2009/0301942 A1* 12/2009 Wyatt ................ G01N 30/0005
 209/250
2011/0290724 A1* 12/2011 Wyatt ................ G01N 30/0005
 210/101

* cited by examiner

INJECTING A LIQUID BORNE SAMPLE INTO A FIELD FLOW FRACTIONATOR

PRIORITY

This application claims priority to U.S. Provisional Patent Application No. 62/469,403, filed Mar. 9, 2017, and to PCT Application No. PCT/US2018/021875, filed Mar. 9, 2018.

BACKGROUND

The present disclosure relates to field flow fractionators, and more specifically, to injecting a liquid borne sample into a field flow fractionator.

SUMMARY

The present invention provides an apparatus and method of injecting a liquid borne sample into a field flow fractionator and a method of forming a top plate and spacer for injecting a liquid borne sample into a field flow fractionator. In an exemplary embodiment, the field flow fractionation unit includes (1) a top plate including (a) a sample injection inlet port configured to allow a liquid borne sample to be injected into a separation channel, (b) a sample injection outlet port configured to allow liquid contained within the separation channel to be withdrawn, and (2) a spacer including (a) a separation channel cavity defining at least a portion of the separation channel, where the separation channel is defined by a surface of the top plate, sidewalls of the spacer, and a surface of a membrane, (b) a sample injection inlet cavity configured to be in fluid contact with the separation channel and located substantially beneath the sample injection inlet port, where the sample injection inlet cavity is configured to act as an injection inlet path, (c) a sample injection outlet cavity configured to be in fluid contact with the separation channel and located substantially beneath the sample injection outlet port, where the sample injection outlet cavity is configured to act as an injection outlet path, (d) where the sample injection inlet cavity is adjacent to a first sidewall of the separation channel cavity and the sample injection outlet cavity is adjacent to a second sidewall of the separation channel cavity, and (e) where the first sidewall is opposite across a width of the separation channel cavity from the second sidewall, such that the injection inlet path and the injection outlet path are configured to define an injection channel that is essentially perpendicular to the length of the separation channel and that spans the width of the separation channel cavity.

In an exemplary embodiment, the method of injecting a liquid borne sample into a field flow fractionator includes (1) flowing a mobile phase into a channel flow inlet port of a top plate of a field flow fractionation unit and out of a channel flow outlet port of the top plate, thereby filling with the mobile phase a separation channel, defined by a surface of the top plate, sidewalls of a spacer of the field flow fractionation unit, and a surface of a membrane of the field flow fractionation unit, thereby establishing a channel flow of the mobile phase along a length of the separation channel, (2) sealing the channel flow inlet port and the channel flow outlet port, thereby stopping the channel flow, and (3) in response to the sealing, injecting a liquid borne sample via a sample injection inlet port of the top plate into the separation channel and simultaneously withdrawing liquid contained within the separation channel via a sample injection outlet port of the top plate, (a) where the spacer includes (i) a separation channel cavity defining at least a portion of the separation channel, (ii) a sample injection inlet cavity configured to be in fluid contact with the separation channel and located substantially beneath the sample injection inlet port, where the sample injection inlet cavity is configured to act as an injection inlet path, (iii) a sample injection outlet cavity configured to be in fluid contact with the separation channel and located substantially beneath the sample injection outlet port, where the sample injection outlet cavity is configured to act as an injection outlet path, (iv) where the sample injection inlet cavity is adjacent to a first sidewall of the separation channel cavity and the sample injection outlet cavity is adjacent to a second sidewall of the separation channel cavity, and (v) where the first sidewall is opposite across a width of the separation channel cavity from the second sidewall, such that the injection inlet path and the injection outlet path are configured to define an injection channel that is essentially perpendicular to the length of the separation channel and that spans the width of the separation channel cavity, thereby forming a line of the liquid borne sample along the injection channel, and (4) allowing particles within the line of the liquid borne sample to relax to at least one accumulation wall in a region of the injection channel under the influence of an applied cross field.

In an exemplary embodiment, the method of forming a top plate and spacer for injecting a liquid borne sample into a field flow fractionator includes (1) forming a sample injection inlet port in a top plate of a field flow fractionation unit, where the sample injection inlet port configured to allow a liquid borne sample to be injected into a separation channel defined by a surface of the top plate, sidewalls of a spacer of the field flow fractionation unit, and a surface of a membrane of the field flow fractionation unit, (2) forming a sample injection outlet port in the top plate, where the sample injection outlet port is configured to allow liquid contained within the separation channel to be withdrawn, (3) forming a separation channel cavity in the spacer, where the separation channel cavity defines at least a portion of the separation channel, (4) forming a sample injection inlet cavity in the spacer, where the sample injection inlet cavity is configured to be in fluid contact with the separation channel and is configured to be located substantially beneath the sample injection inlet port, where the sample injection inlet cavity is configured to act as an injection inlet path, and (5) forming a sample injection outlet cavity, where the sample injection outlet cavity is configured to be in fluid contact with the separation channel and is configured to be located substantially beneath the sample injection outlet port, where the sample injection outlet cavity is configured to act as an injection outlet path, where the sample injection inlet cavity is adjacent to a first sidewall of the separation channel cavity and the sample injection outlet cavity is adjacent to a second sidewall of the separation channel cavity, and where the first sidewall is opposite across a width of the separation channel cavity from the second sidewall, such that the injection inlet path and the injection outlet path are configured to define an injection channel that is essentially perpendicular to the length of the separation channel and that spans the width of the separation channel cavity.

DETAILED DESCRIPTION

Figure 1:
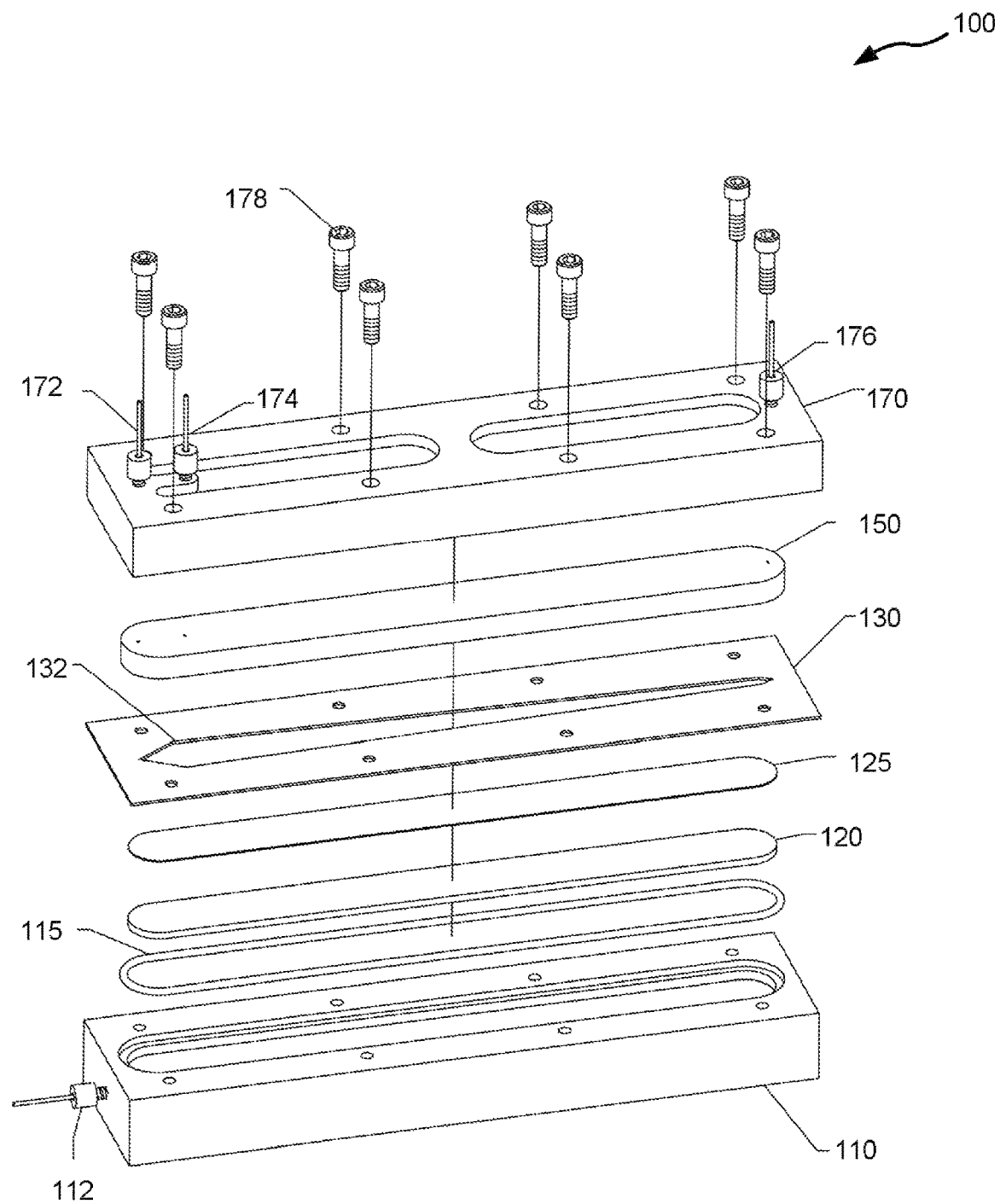
FIG. 1 depicts a current asymmetric field flow fractionation channel assembly.

The present invention provides an apparatus and method of injecting a liquid borne sample into a field flow fractionator and a method of forming a top plate and spacer for injecting a liquid borne sample into a field flow fractionator. In an exemplary embodiment, the field flow fractionation unit includes (1) a top plate including (a) a sample injection inlet port configured to allow a liquid borne sample to be injected into a separation channel, (b) a sample injection outlet port configured to allow liquid contained within the separation channel to be withdrawn, and (2) a spacer including (a) a separation channel cavity defining at least a portion of the separation channel, where the separation channel is defined by a surface of the top plate, sidewalls of the spacer, and a surface of a membrane, (b) a sample injection inlet cavity configured to be in fluid contact with the separation channel and located substantially beneath the sample injection inlet port, where the sample injection inlet cavity is configured to act as an injection inlet path, (c) a sample injection outlet cavity configured to be in fluid contact with the separation channel and located substantially beneath the sample injection outlet port, where the sample injection outlet cavity is configured to act as an injection outlet path, (d) where the sample injection inlet cavity is adjacent to a first sidewall of the separation channel cavity and the sample injection outlet cavity is adjacent to a second sidewall of the separation channel cavity, and (e) where the first sidewall is opposite across a width of the separation channel cavity from the second sidewall, such that the injection inlet path and the injection outlet path are configured to define an injection channel that is essentially perpendicular to the length of the separation channel and that spans the width of the separation channel cavity.

In an exemplary embodiment, the method of injecting a liquid borne sample into a field flow fractionator includes (1) flowing a mobile phase into a channel flow inlet port of a top plate of a field flow fractionation unit and out of a channel flow outlet port of the top plate, thereby filling with the mobile phase a separation channel, defined by a surface of the top plate, sidewalls of a spacer of the field flow fractionation unit, and a surface of a membrane of the field flow fractionation unit, thereby establishing a channel flow of the mobile phase along a length of the separation channel, (2) sealing the channel flow inlet port and the channel flow outlet port, thereby stopping the channel flow, and (3) in response to the sealing, injecting a liquid borne sample via a sample injection inlet port of the top plate into the separation channel and simultaneously withdrawing liquid contained within the separation channel via a sample injection outlet port of the top plate, (a) where the spacer includes (i) a separation channel cavity defining at least a portion of the separation channel, (ii) a sample injection inlet cavity configured to be in fluid contact with the separation channel and located substantially beneath the sample injection inlet port, where the sample injection inlet cavity is configured to act as an injection inlet path, (iii) a sample injection outlet cavity configured to be in fluid contact with the separation channel and located substantially beneath the sample injection outlet port, where the sample injection outlet cavity is configured to act as an injection outlet path, (iv) where the sample injection inlet cavity is adjacent to a first sidewall of the separation channel cavity and the sample injection outlet cavity is adjacent to a second sidewall of the separation channel cavity, and (v) where the first sidewall is opposite across a width of the separation channel cavity from the second sidewall, such that the injection inlet path and the injection outlet path are configured to define an injection channel that is essentially perpendicular to the length of the separation channel and that spans the width of the separation channel cavity, thereby forming a line of the liquid borne sample along the injection channel, and (4) allowing particles within the line of the liquid borne sample to relax to at least one accumulation wall in a region of the injection channel under the influence of an applied cross field.

In an exemplary embodiment, the method of forming a top plate and spacer for injecting a liquid borne sample into a field flow fractionator includes (1) forming a sample injection inlet port in a top plate of a field flow fractionation unit, where the sample injection inlet port configured to allow a liquid borne sample to be injected into a separation channel defined by a surface of the top plate, sidewalls of a spacer of the field flow fractionation unit, and a surface of a membrane of the field flow fractionation unit, (2) forming a sample injection outlet port in the top plate, where the sample injection outlet port is configured to allow liquid contained within the separation channel to be withdrawn, (3) forming a separation channel cavity in the spacer, where the separation channel cavity defines at least a portion of the separation channel, (4) forming a sample injection inlet cavity in the spacer, where the sample injection inlet cavity is configured to be in fluid contact with the separation channel and is configured to be located substantially beneath the sample injection inlet port, where the sample injection inlet cavity is configured to act as an injection inlet path, and (5) forming a sample injection outlet cavity, where the sample injection outlet cavity is configured to be in fluid contact with the separation channel and is configured to be located substantially beneath the sample injection outlet port, where the sample injection outlet cavity is configured to act as an injection outlet path, where the sample injection inlet cavity is adjacent to a first sidewall of the separation channel cavity and the sample injection outlet cavity is adjacent to a second sidewall of the separation channel cavity, and where the first sidewall is opposite across a width of the separation channel cavity from the second sidewall, such that the injection inlet path and the injection outlet path are configured to define an injection channel that is essentially perpendicular to the length of the separation channel and that spans the width of the separation channel cavity.

In order to provide an alternate means of injection of the sample into the channel, a spacer, channel assembly and method of sample injection is disclosed. An embodiment of the present invention includes a spacer designed to allow injection of the sample across a band stretching from one side of the channel breadth to the other in a relatively compact line (hereinafter "line injection"). For example, the present invention could simplify the process of sample injection while obviating the focusing step. Furthermore, in systems where focusing in impractical, the present invention could allow a more precise starting sample line than has been possible with current systems.

Definitions

Particle

Throughout this specification, the term "particle" refers to the constituents of liquid sample aliquots that may be molecules of varying types and sizes, nanoparticles, virus like particles, liposomes, emulsions, bacteria, colloids, etc. Their size range may lie between 1 nm and several thousand micrometers.

Field Flow Fractionation

The separation of particles in a solution by means of field flow fractionation, FFF, was studied and developed extensively by J. C. Giddings beginning in the early 1960s. The basis of these techniques lies in the interaction of a channel-constrained sample and an impressed field applied perpendicular to the direction of flow. Among those techniques of current interest is cross flow FFF, often called symmetric flow (SFlFFF), where an impressed field is achieved by introducing a secondary flow perpendicular to the sample borne fluid within the channel. There are several variations of this technique including asymmetric flow FFF (i.e., A4F), and hollow fiber (H4F) flow separation.

Other FFF techniques include (i) sedimentation FFF (SdFFF), where a gravitational/centrifugal cross force is applied perpendicular to the direction of the channel flow, (ii) electrical FFF (EFFF), where an electric field is applied perpendicular to the channel flow, and (ii) thermal FFF (ThFFF), where a temperature gradient is transversely applied.

Common to all these methods of field flow fractionation is a fluid, or mobile phase, into which is injected an aliquot of a sample whose separation into its constituent fractions is achieved by the application of a cross field. Many of the field flow fractionators allow for the control and variation of the strength of the cross field during the time the sample aliquot flows down the channel, be it electrical field, cross flow, thermal gradient, or other variable field. More recently, direct control of crossflow at discrete positions along the flow path has been disclosed in U.S. Pat. No. 8,163,182, issued Apr. 24, 2012, which is herein incorporated by reference in its entirety, U.S. Pat. No. 8,206,590, issued Jun. 26, 2012, which is herein incorporated by reference in its entirety, and U.S. Pat. No. 8,333,891, issued Dec. 18, 2012, which is herein incorporated by reference in its entirety.

Symmetric Flow Cross Flow Fractionator (SFlFFF)

As an illustration of the separation of particles by field flow fractionation, a simplification of perhaps the most straightforward system, a SFlFFF, is described. A sample is injected into an inlet port along with the spending mobile phase. The sample is allowed to undergo a so-called "relaxation phase," where there is no applied channel flow, but larger particles are forced further down the height of the channel than smaller particles by the constantly applied cross flow. Once the channel flow is resumed, the sample aliquot begins to undergo non-steric separation while it moves down the length channel with the smaller particles leading the larger ones, as they inhabit a region of the cross section of the channel flow nearer the center of the height of the channel where the channel flow is most swift. By increasing the cross flow rate, the separation of all species continues while the larger fractions begin to trail further behind their smaller sized companions. After exiting the channel through the outlet port the fractionated sample may be analyzed using various detectors.

Asymmetric Flow FFF (A4F)

An asymmetric flow FFF (A4F) is generally considered a variation of the earlier developed SFlFFF. The elements of an A4F channel assembly 100 are depicted in FIG. 1. A4F channel assembly 100 includes the following elements and the means to hold them together: (1) a bottom assembly structure 110 holding a liquid-permeable frit 120 surrounded by a sealing O-ring 115, (2) a permeable membrane 125 that lies on the frit 120, (3) a spacer 130 of thickness from about 75 µm to 800 µm into which has been cut a cavity 132, and (4) a top assembly structure 170 generally holding a transparent plate 150 of polycarbonate material, such as Lexan™, or glass.

The resulting sandwich is held together with bolts 178 or other means, such as applied pressure adequate to keep the channel sealed against leaks, such pressure may be applied by vise or clamping mechanism so long as it is able to provide relatively even pressure across the channel assembly such that no leaks occur. The generally coffin-shaped or tapered cavity 132 in the spacer 130 serves as the channel in which separation will occur. The top assembly structure 170 usually contains three holes, called ports, that pass through the top plate 150 and are centered above the channel permitting the attachment of fittings thereto. These ports are (a) a mobile phase inlet port 172 located near the beginning of the channel and through which is pumped the carrier liquid, the so-called mobile phase, (b) a sample port 174, downstream of the inlet port, into which an aliquot of the sample to be separated is introduced to the channel and focused thereunder, and (c) an exit port 176 through which the fractionated aliquot leaves the channel near the end of the cavity.

A single pump, as used in the A4F preferred embodiment, provides the mobile phase at the inlet port 172. The mobile phase is the source of the following two distinct flows: (i) flow through the frit-supported membrane producing a cross flow transverse to the injected sample, and (ii) longitudinal flow, also called a channel flow parallel to the membrane and leaving the channel with the fractionated sample through the exit port 176. Because of the small diameter of the outlet tubing as well as back pressure caused by detectors downstream of the channel, the impedance to the sample-containing channel flow is generally much greater than the impedance produced by the frit-supported membrane and the cross flow there through. This cross flow is controlled by a needle valve or similar computer interfaced means housed in a remote control unit. The total flow that passes through the membrane 125 and, therefrom, through the supporting frit 120, is controlled and regulated by means of a remote valve that controls the outflow through fitting 112.

Thus, if the mobile phase inlet flow at 172 is, for example, 2 ml/min and the flow through the outflow controlling needle valve programmed to provide 0.5 ml/min through fitting 112, the total outlet flow through the sample outlet port 176 would be 1.5 ml/min. Thus, the single needle valve controller regulates the split of the mobile phase into two components: the total so-called cross flow through the membrane 125 and exiting through fitting 112 and, the remaining outflow through port 176. Recall that the outflow through port 176 is subject to a large impedance/back pressure arising from its narrow outlet and the detectors downstream. The supporting frit is very porous and produces negligible impedance to flow through it.

Prior to separation, a sample aliquot is injected at the sample injection port 174, and a reversed flow, created by a partial split off from the normal mobile phase stream, is introduced through the exit port 176. The two counter flows keep the injected sample aliquot in position near injection port 174, focusing it thereby within a small region transverse to the usual longitudinal channel flow. During this focusing step the aliquot equilibrates. Once equilibrated, the sample aliquot is released by restoring the channel flow. The thus-focused aliquot will fractionate as it is driven forward by the channel flow while a transverse component acts to drive it downward toward the "accumulation wall" which is, in this case, comprised of the frit-supported membrane.

Once the particles have been separated by the A4F unit, the separated particles are generally examined by means of different classes of detection instruments responsive thereto. These may include light-scattering photometers, UV absorption meters, differential refractive index detectors, differential viscometers, and combinations thereof. Such devices are used to characterize the separated particles/molecules in terms of their molar mass, intrinsic viscometry, size, charge, etc.

In certain situations and with various techniques, such as Thermal FFF and those involving high pressures and small channels, it is not practical to include the focusing step described above. In a ThFFF system, for example, wherein nickel coated copper cells are generally used with a thin spacer, the cell volume will be very low. This means that when the sample is injected into the cell it will be spread out over a large round volume, similar to that experienced in A4F prior to the focusing stage. This will affect the separation since the wider the initial band, the wider all the bands are after separation. The smaller molecules from the back of the band must pass the big molecules from the front, and with extremely short channels, there generally is not adequate time for them to do so. Therefore in these situations the eluting sample will not be properly resolved into its constituent elements. It is therefore very desirable to have a means by which a sample may be injected into the channel in a narrow line perpendicular to the direction of the channel flow, thereby essentially mimicking the focusing step. Even in cases where the focusing step is possible, elimination of this step speeds the elution and minimized overfocusing artifacts.

Injection Sequences

Figure 2:
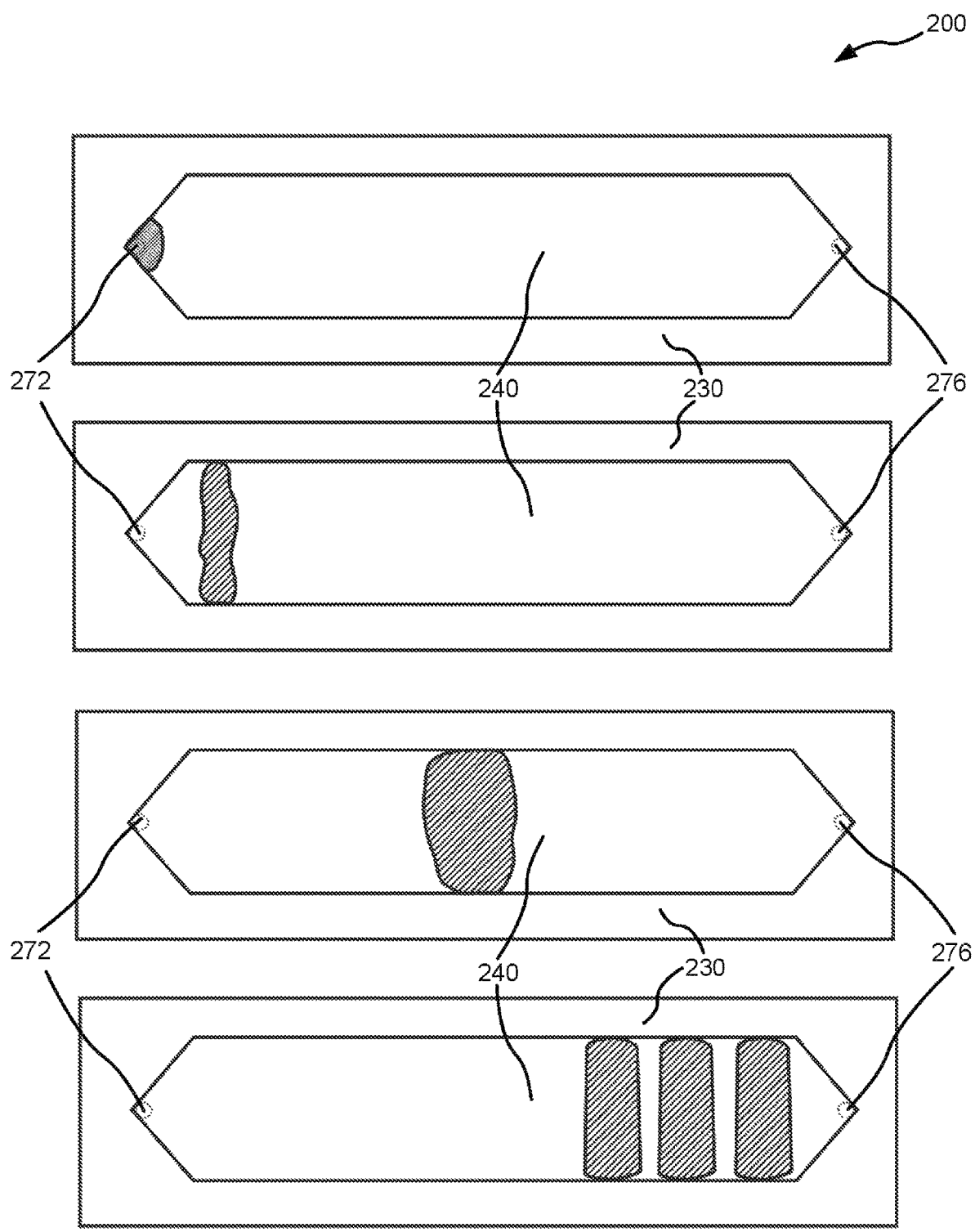
FIG. 2 depicts injection and separation of a sample in a current symmetric flow field flow fractionation channel over time.
Figure 3:
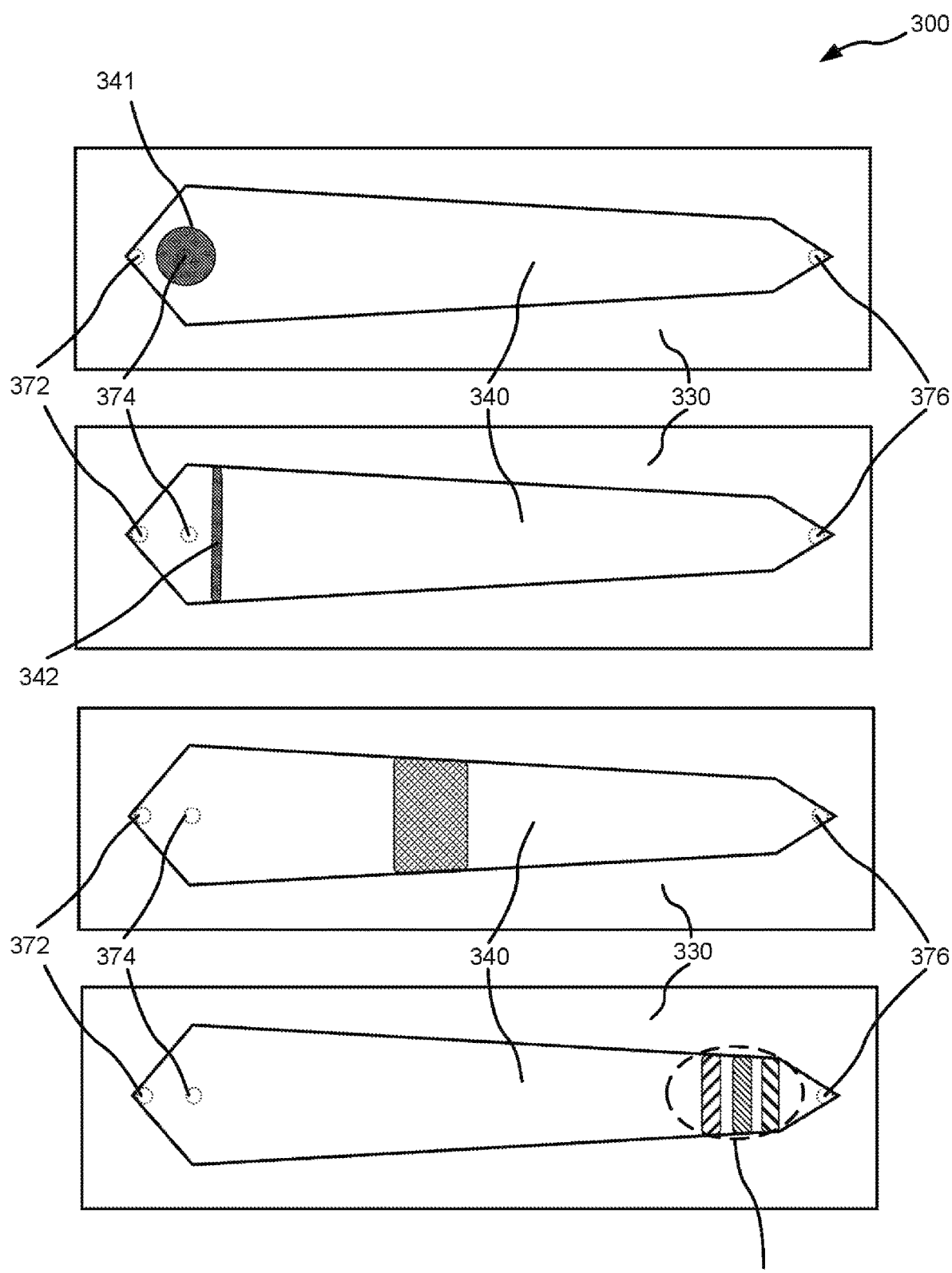
FIG. 3 depicts injection and separation of a sample in a current asymmetric field flow fractionation measurement over time including the focusing step.

The injection sequence of samples into various alternative FFF systems is shown by reference to FIG. 2 and FIG. 3. FIG. 2 depicts a symmetrical FFF 200, with a symmetrical FFF channel 240 cut into a spacer 230. A sample is injected through injection port 272 at time t=1 and enters the separation channel 240. At time t=2 the channel flow, entering through injection port 272 is stopped, and the cross flow, continually applied, pushes the sample toward the frit and supported membrane at the bottom of channel 240. Simultaneously the sample spreads out across the breadth of channel 240. This is known as the "relaxation phase." Once sufficient time has passed such that it can be reliably considered that the sample has been forced to the bottom of channel 240 and diffusion has allowed the smaller constituents to flow higher into channel 240 than their larger counterparts, and the entire sample is spread as broadly as possible across width of channel 240, the channel flow is resumed. At time t=3 the sample has moved significantly down channel 240. At time t=4 the sample is expected to be separated into its constituent sizes (as SFIFFF separates by size) and thereafter elutes through exit port 276. The sample then generally proceeds to a sample measurement system such as a MALS detector, as discussed above.

As depicted in FIG. 3, in a similar manner to the relaxation phase of SFIFFF, A4F utilizes a focusing step, where the sample injected into the channel in an extended region 341 is focused into a thin line of sample 342 spanning the breadth/width of channel 340, while simultaneously distributing particles by size across the channel height prior to the resumption of the channel flow down the length of the channel. Focusing in A4F is achieved by simultaneously applying flow into ports 372 and 374 and allowing the solvent to flow out through the bottom membrane. By adjusting the ratio of the flow through the ports 372 and 376, the sample can be induced to form a narrow line 342, whose location along channel 340 depends on the ratio of the flow through the two ends. Then when the channel flow is established, the fractionation begins from an initially narrow band 342 so the resulting fractionated bands 343 are similarly narrow. If the elution were to start without first applying the focusing step, the extended sample injection region 341 would result in fractionated bands with poorer resolution. The focusing step is unique to the A4F variant. For the other FFF variants there is no analogous mechanism.

FIG. 3 depicts an A4F channel separation 300. In contrast to SFIFFF, there is no independent pumping means to drive the cross flow, but rather a portion of the effluent injected through a flow inlet port 372 is driven through the membrane at the bottom of the channel 340, which is generally of a coffin shape which has been cut into the spacer 330. The sample is injected through a sample injection port 374, distinct from the flow inlet port 372. Once the injection into channel 340 is complete, at time t=1, sample injection port 374 is sealed, and fluid pressure is created by flowing solvent into flow inlet port 372 and flow outlet port 376 simultaneously at a ratio chosen so as to focus the sample into a narrow line generally near the injection port. Once the sample is adequately focused and spans the breadth of channel 340, at time t=2, the flow through outlet 376 is reduced or eliminated, and flow continues down the separation channel 340 towards outlet 376. At time t=3 the sample has moved significantly down the channel length, and at time t=4 the sample is expected to be separated into its constituent sizes (as A4F also separates by size). The now fractionated sample elements proceed to elute through the outlet port 376 and continue on to a sample measurement system.

Various other FFF systems make use of similar injection/elution methods. However, these may be complicated by the limitations associated with the hardware used in each system. For example, visual inspection of an A4F channel allows one to calibrate, through the use of a visible dye, proper procedures for optimizing the focusing step. By contrast, in electrical FFF systems the electrodes, which apply the cross field, are generally made of non-transparent materials, although there are exceptions to this rule, for example, as disclosed in U.S. Pat. No. 6,180,906, which is herein incorporated by reference in its entirety. In situations where the channel cannot be optically observed, and therefore the focusing calibrated, it is particularly important to find an alternate means by which the initial sample band may be made to start out as a narrow line, similar to the one produced by the focusing step in traditional A4F. An additional complication in systems wherein the applied cross field is not a fluid flow is that it is not possible focus the sample with any reliability, as flow can only proceed along the separation channel in one direction since there is generally no outflow possible through the accumulation wall.

Need for Narrow Injection of Liquid Borne Sample

Thus, there is a need to provide for an injection narrow (with respect to the size of extended sample injection region 341) of a liquid borne sample into a field flow fractionator without requiring focusing. Such injection could improve resolution for FFF variants that do not have a native focusing mechanism. For A4F that does have a focusing mechanism, the focusing step could improve resolution, but the focusing process concentrates the sample on the membrane and could give rise to overfocusing artifacts. For example, overfocusing can cause the sample to aggregate or to stick to the membrane on the focus line. When using A4F, the ability to inject a narrow sample line could means that the focusing step could be completed more rapidly and the overfocusing artifacts could be mitigated.

Field Flow Fractionation Unit

Figure 4A:
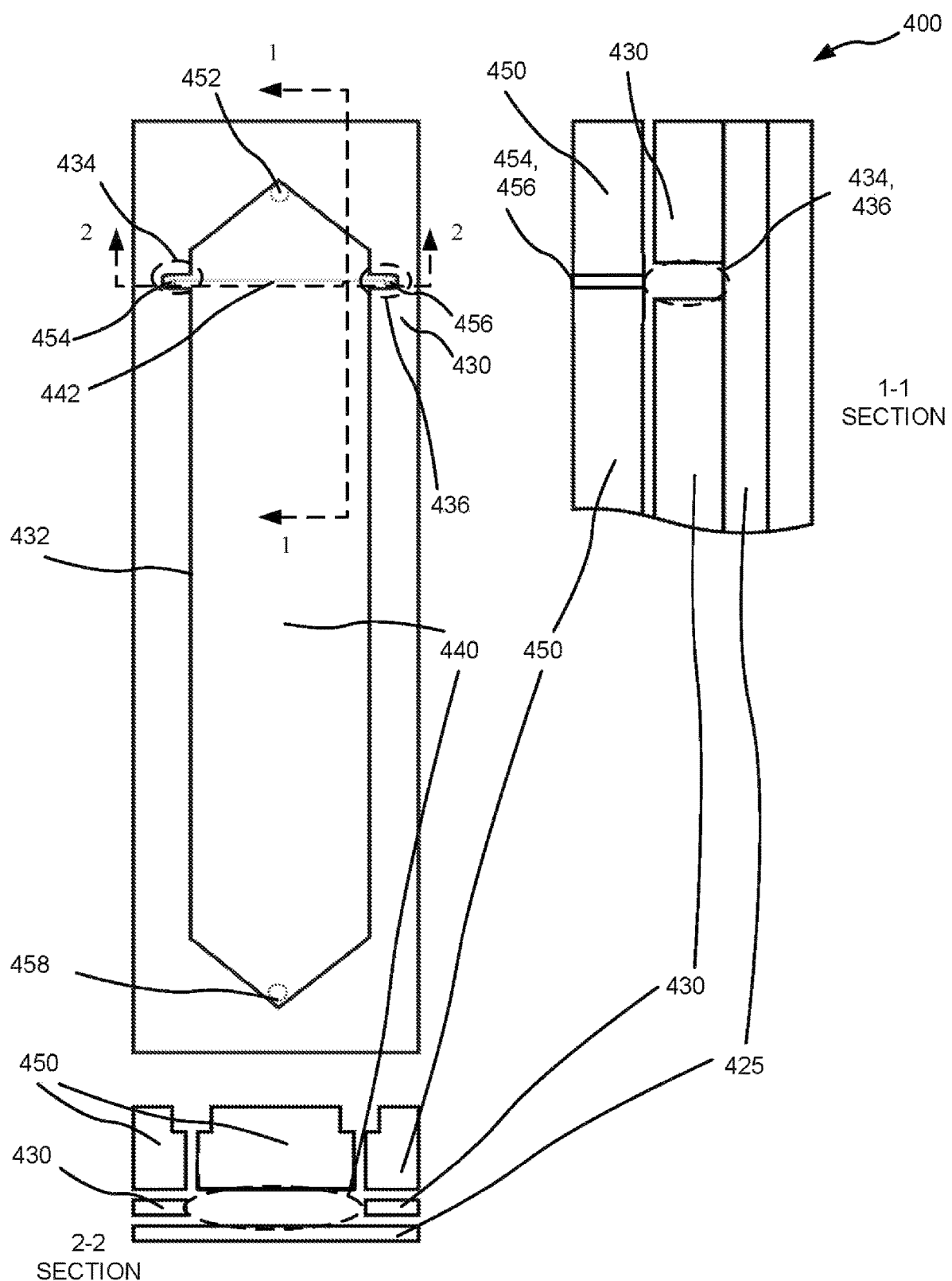
FIG. 4A depicts a spacer in accordance with an embodiment of the present invention.
Figure 4B:
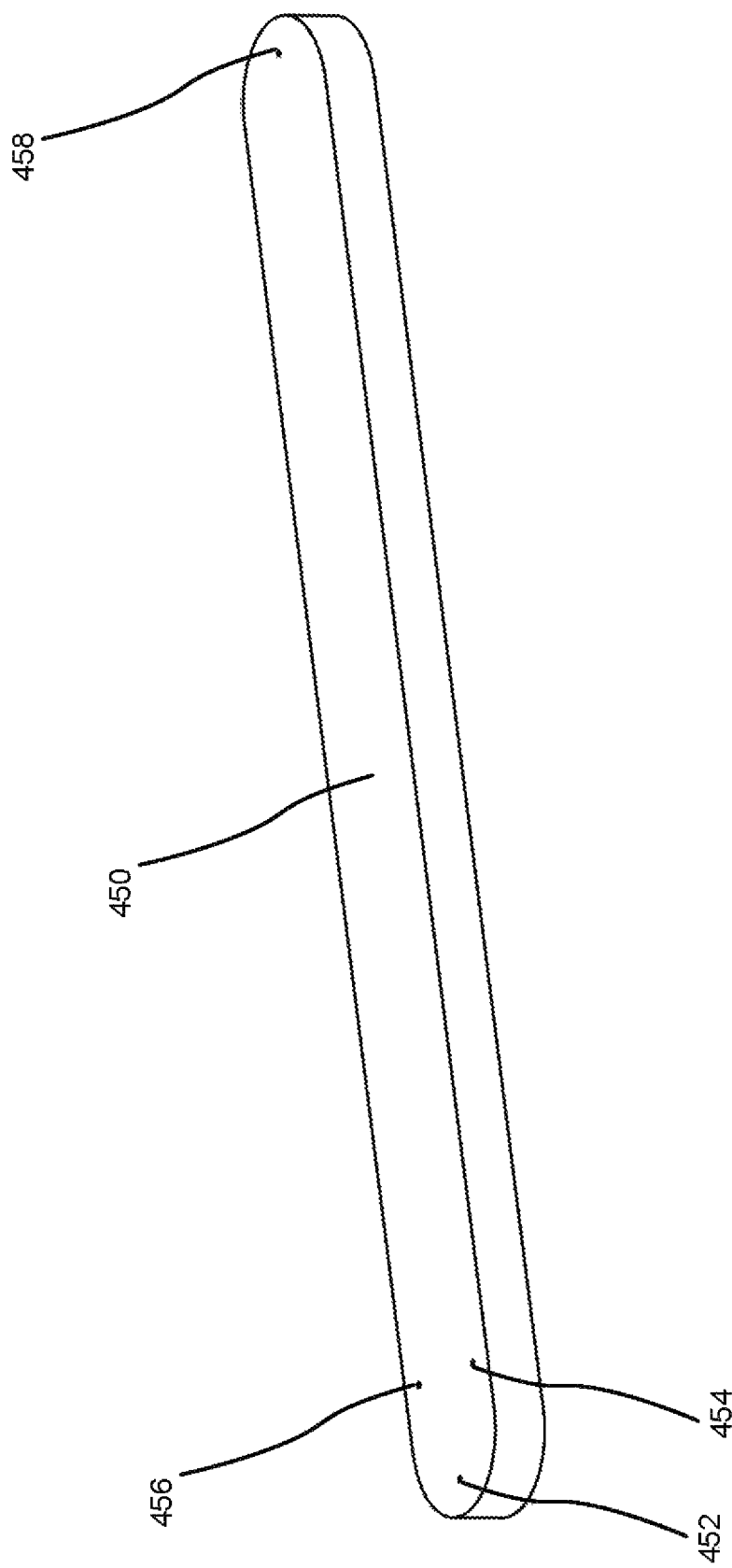
FIG. 4B depicts a top plate in accordance with an embodiment of the present invention.

Referring to FIG. 4A and FIG. 4B, in an exemplary embodiment, the present invention provides a field flow fractionation unit 400 of injecting a liquid borne sample into a field flow fractionator. In an exemplary embodiment, field flow fractionation unit 400 includes (1) a top plate 450 including (a) a sample injection inlet port 454 configured to allow a liquid borne sample to be injected into a separation channel, (b) a sample injection outlet port 456 configured to allow liquid contained within separation channel 440 to be withdrawn, and (2) a spacer 430 including (a) a separation channel cavity 432 defining at least a portion of separation channel 440, where separation channel 440 is defined by a surface of top plate 450, sidewalls of spacer 430, and a surface of a membrane 425, as shown via section 1-1, (b) a sample injection inlet cavity 434 configured to be in fluid contact with separation channel 440 and located substantially beneath sample injection inlet port 454, where sample injection inlet cavity 434 is configured to act as an injection inlet path, as shown via section 2-2, (c) a sample injection outlet cavity 436 configured to be in fluid contact with separation channel 440 and located substantially beneath sample injection outlet port 456, where sample injection outlet cavity 436 is configured to act as an injection outlet path, as shown via section 2-2, (d) where sample injection inlet cavity 434 is adjacent to a first sidewall of separation channel cavity 432 and sample injection outlet cavity 436 is adjacent to a second sidewall of separation channel cavity 432, and (e) where the first sidewall is opposite across a width of separation channel cavity 432 from the second sidewall, such that the injection inlet path and the injection outlet path are configured to define an injection channel 442 that is essentially perpendicular to the length of separation channel 440 and that spans the width of separation channel cavity 432.

In an embodiment, field flow fractionation unit 400 includes additional nooks or paths beneath two sample injection ports 454 and 456 located at opposite ends of the breadth/width of separation channel 440, defining, thereby, a virtual second channel (e.g., injection channel 442) extending there between, essentially perpendicular to the length of the separation channel 440. For example, field flow fractionation unit 400 could be used with FFF methods which have a symmetric shaped channel (e.g., SFIFFF, thermal FFF, electrical FFF). In an embodiment, separation channel 440 has been cut into spacer 430, which is generally made from a sheet of material such as Biaxially-oriented polyethylene terephthalate (BoPET) commonly referred to by the trade name Mylar®. The additional two injection paths 434 and 436 are cut into spacer 430, one of which will serve as a path through which the sample will be introduced into separation channel 440 from sample injection inlet port 454 in top plate 450, and the other will serve as a path for the sample overflow from separation channel 440 to sample injection outlet port 456 in top plate 450. The line region between these areas defines an injection channel 442. For example, during the injection process, the solvent flow through all of the other flow paths is blocked, such that the sample is injected through port 454, and solvent is withdrawn through port 456, thereby causing the sample to form a thin band in injection channel 442. Once the sample has been injected into channel 440, the channel flow is introduced through inlet port 452 in top plate 450 and flow carrying the ultimately separated sample exits channel 440 through a channel flow outlet port 458 in top plate 450 near the end of separation channel 440. Depending on the FFF technique used, other non-sample carrying fluid may also exit the channel through other paths, such as through a frit supported membrane 425 located beneath spacer 430, as is traditional in A4F and SFIFFF.

Figure 4C:
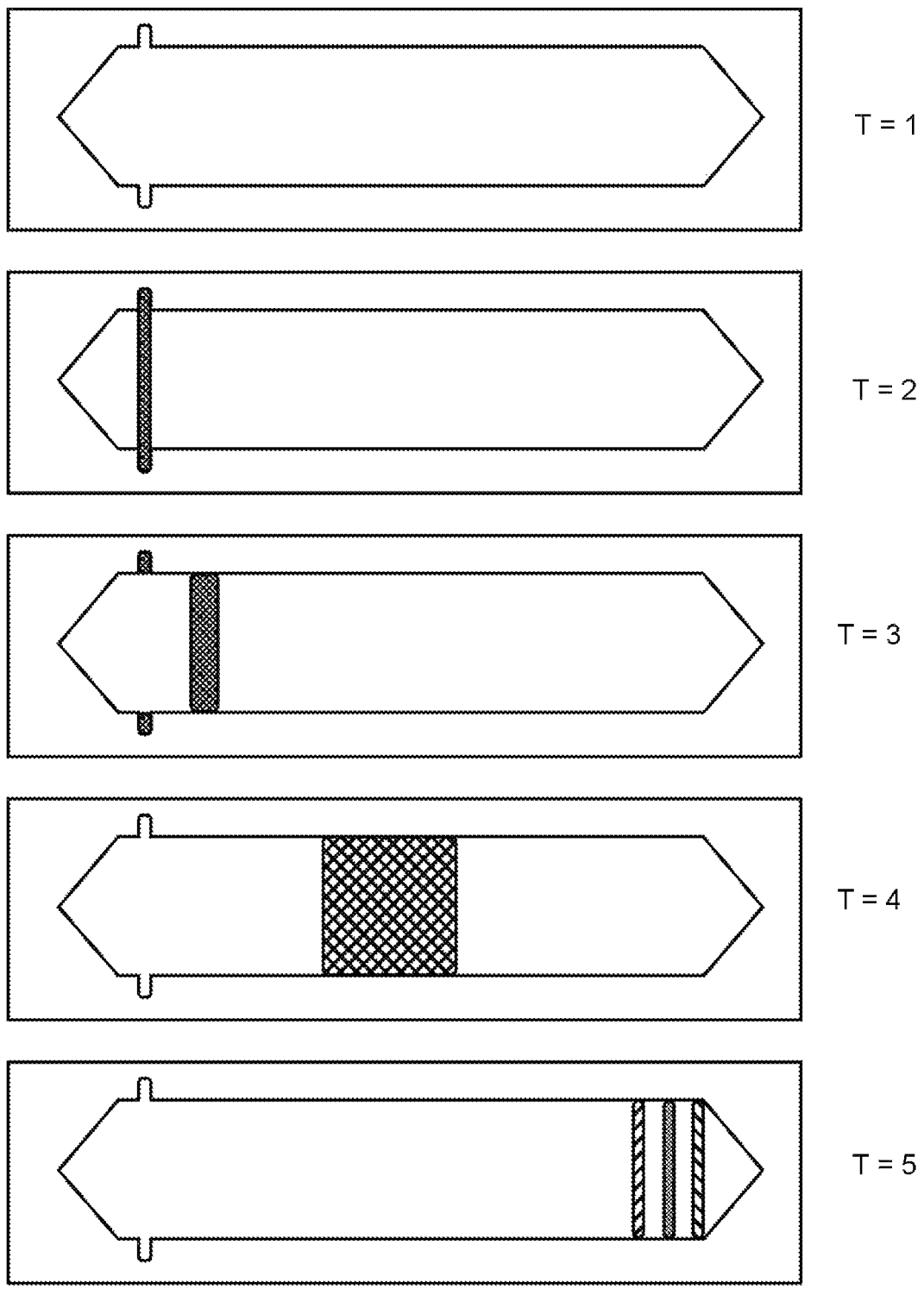
FIG. 4C depicts injection and separation of a sample over time using a spacer and a top plate in accordance with an embodiment of the present invention.

In an embodiment, FIG. 4C depicts injection and separation of a sample overtime using field flow fractionation unit 400. At time t=0, there may be flow through separation channel 440 entering channel 440 by means of flow inlet port 452 and exiting channel 440 through flow outlet port 458. Some of the mobile phase may exit channel 440 by other means, depending on the FFF technique being employed (e.g., through membrane 425 and a frit). At time t=1, flow to separation channel 440 is stopped (e.g., by stopping the supplying pump and sealing flow outlet port 458, or diverting flow from flow inlet port 452 and bypassing channel 440 by means of a valve or other switching mechanism), such that flow through inlet port 452 and outlet port 458 is restricted or stopped completely such that flow into separation channel 440 would not proceed either down or up the length of separation channel 440. At time t=2, the sample is injected through a sample inlet port 454 and enters sample injection channel 442 through the sample inlet path 434. Simultaneously, fluid is drawn out of sample injection outlet port 456 through the outlet path 436. The negative pressure at outlet path 436 coupled with the positive pressure created by the introduction of the sample flowing into inlet path 434 could allow the newly introduced sample to span the breath of separation channel 440 in a relatively thin straight line (thin with respect to the ratio of the width of separation channel 440 to the length of separation channel 440) a fraction of the length of separation channel 440 along injection channel 442. When the sample is fully injected into injection channel 440, and, if desired, adequate time under the influence of the cross field is given to allow the sample to migrate to the accumulation wall, flow to separation channel 440 could be restored at time t=3, by turning on the channel flow pump or reversing the bypass valve if employed previously, and opening the outlet port 458. At time t=4, the sample has moved significantly down channel 440, and separation has begun. Finally, at time t=5, the sample is expected to be separated into its constituents, and the now fractionated sample could proceed to elute through outlet port 458 and continue on to a sample measurement system.

Pumping

In a further embodiment, field flow fractionation unit 400 further includes at least one sample injection pump configured to connect to sample injection inlet port 454, where the at least one sample injection pump is configured to inject the liquid borne sample into separation channel 440. For example, various means by which the sample may be line injected into the channel could exist. One embodiment includes a dual pump system configured in a push-pull configuration, such that while a first pump injects the sample into sample injection inlet port 454, another pump pulls synchronously from sample injection outlet port 456. In an embodiment, a compressible element (e.g., a bellows, an elastic tube) could be added to the dual pump system to take up the mismatch in the pumping rates of the two pumps.

Loop Injection

Figure 5A:
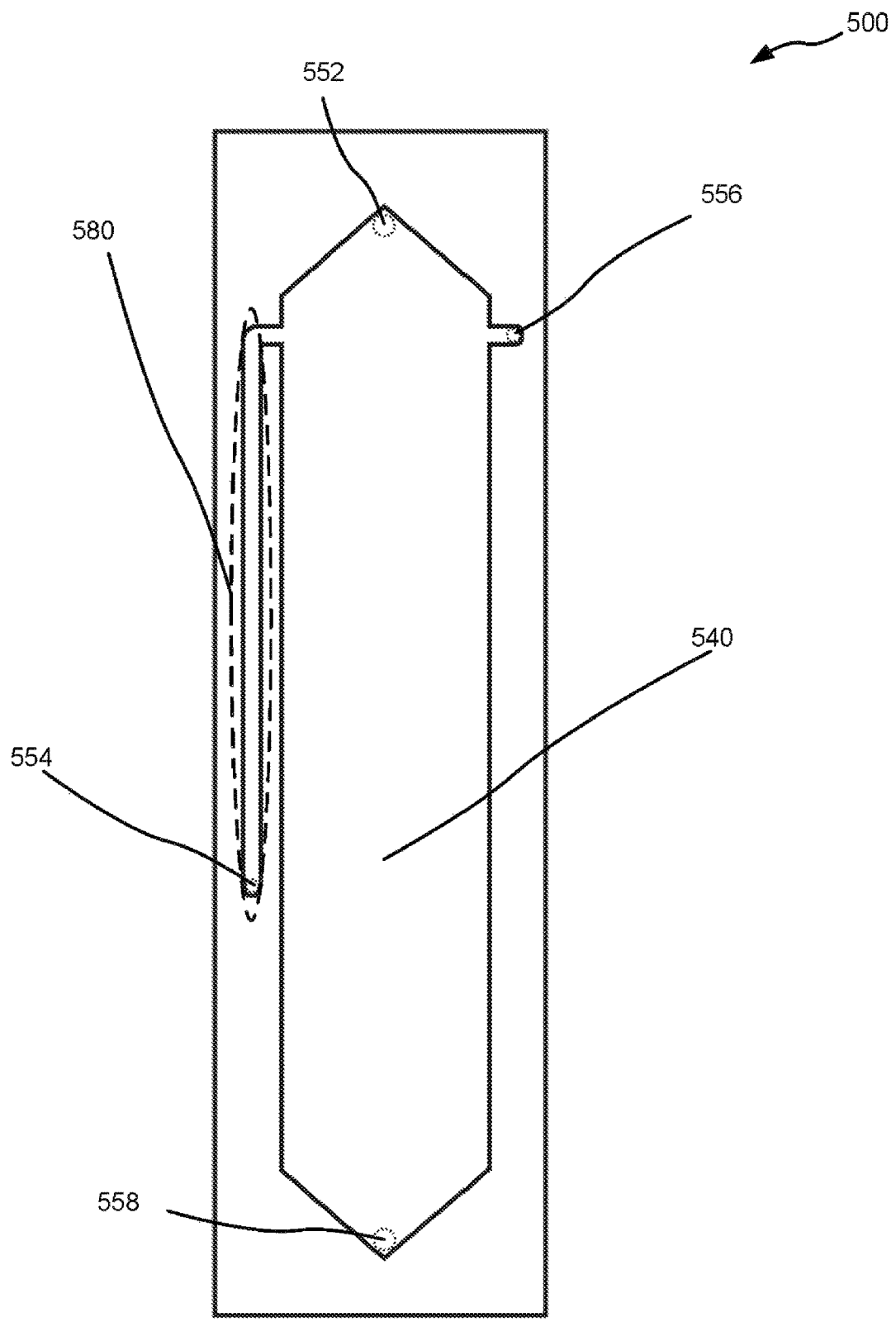
FIG. 5A depicts a spacer in accordance in accordance with an embodiment of the present invention.
Figure 5B:
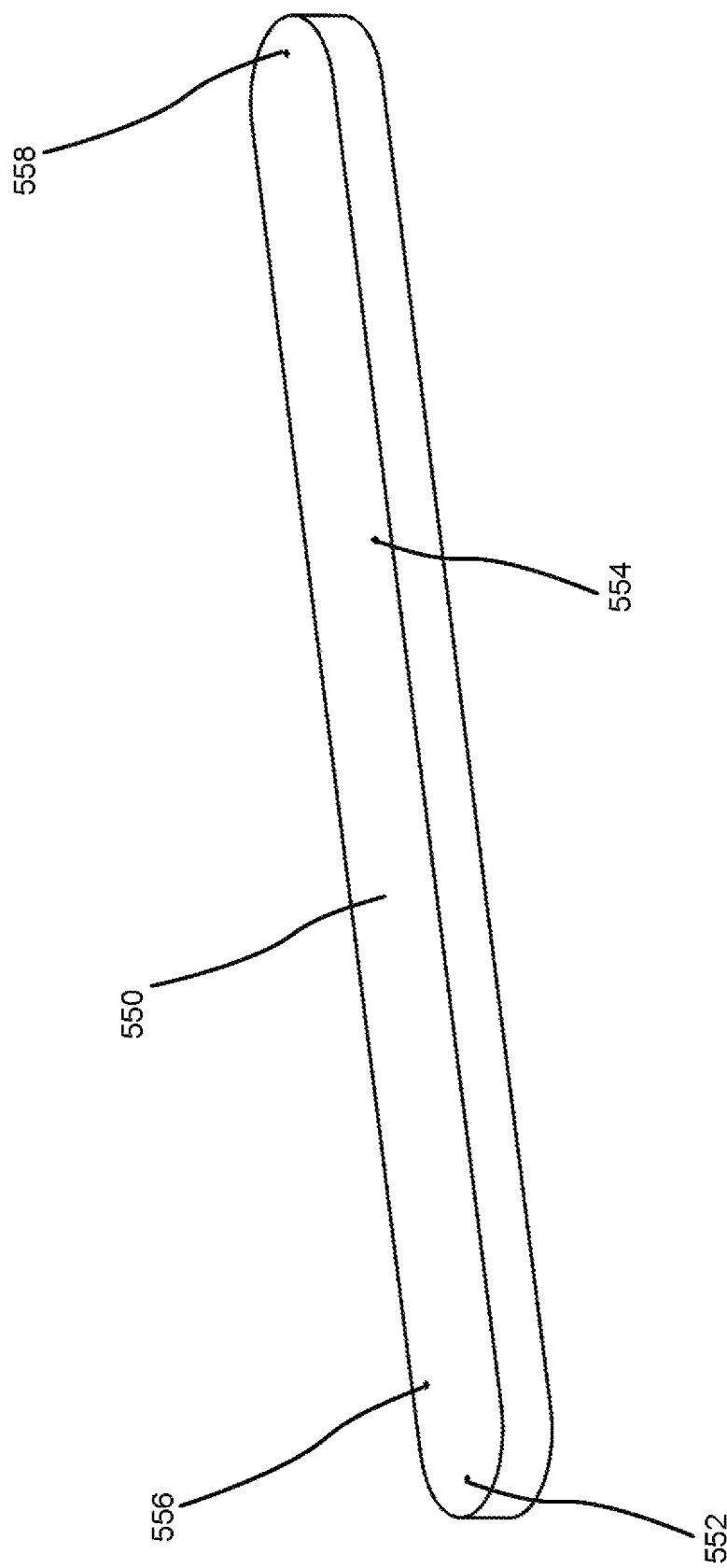
FIG. 5B depicts a top plate in accordance with an embodiment of the present invention.
Figure 6:
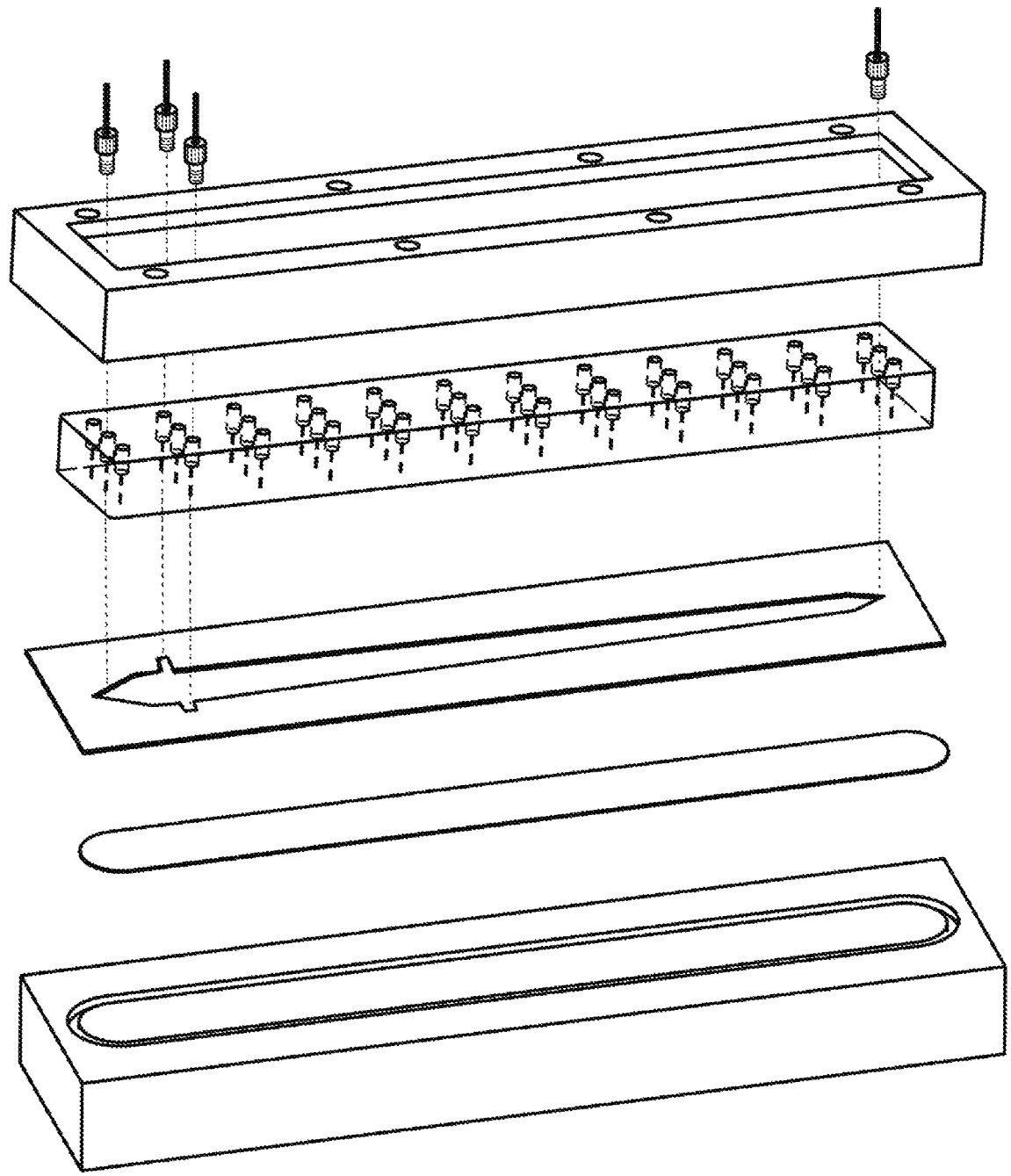
FIG. 6 depicts elements of an FFF channel in accordance with an embodiment of the present invention.

Referring to FIG. 5A and FIG. 5B, sample injection inlet cavity 434 is elongated, thereby forming an elongated sample injection inlet cavity 580, where elongated sample injection inlet cavity 580 (a loop) is configured to allow particles within the liquid borne sample to relax to at least one accumulation wall in a region of elongated sample injection inlet cavity 580 while the liquid borne sample is injected into an elongated sample injection inlet port 554.

Sheath Flows

Figure 7A:
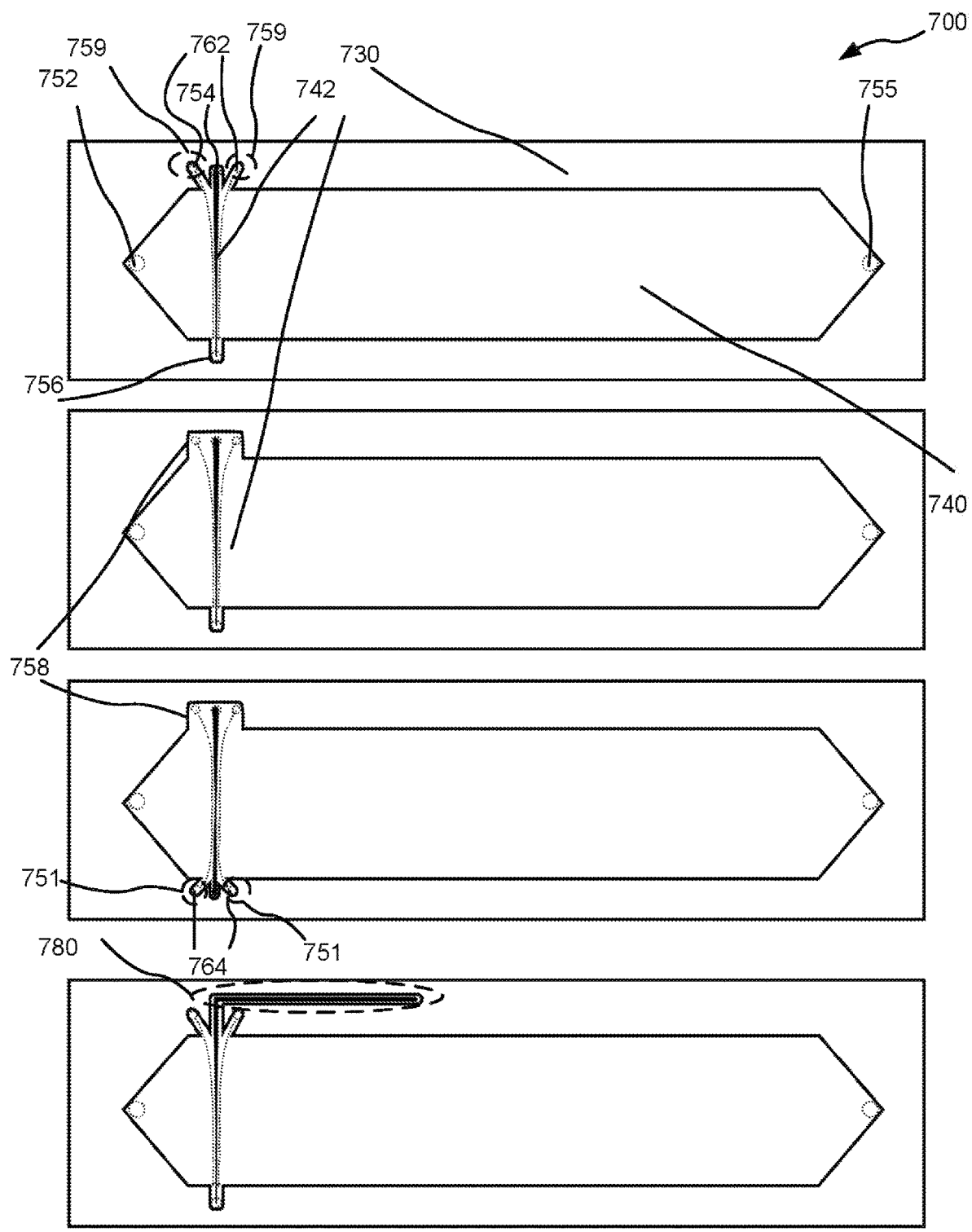
FIG. 7A depicts spacers in accordance with embodiments of the present invention.
Figure 7B:
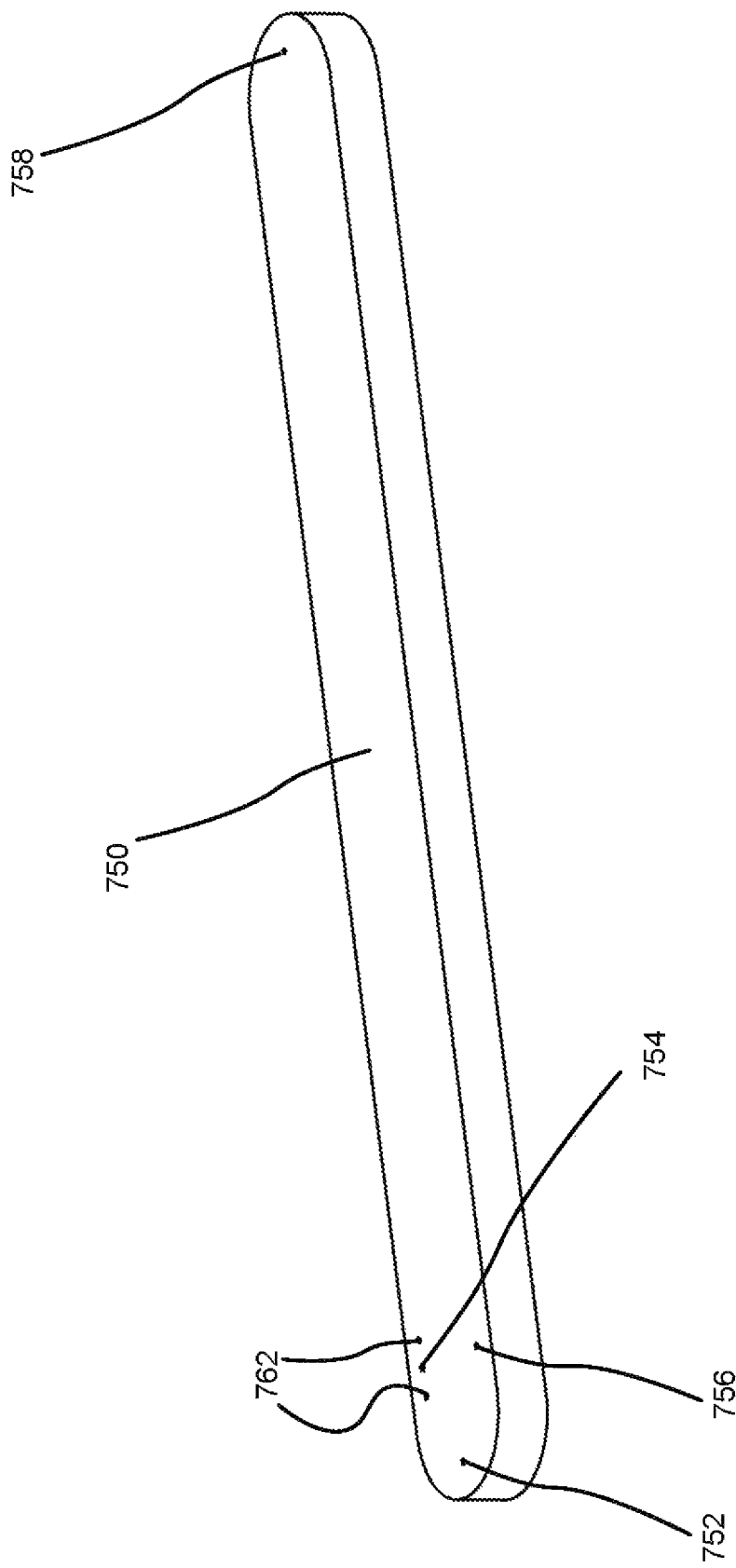
FIG. 7B depicts a top plate in accordance with an embodiment of the present invention.
Figure 7C:
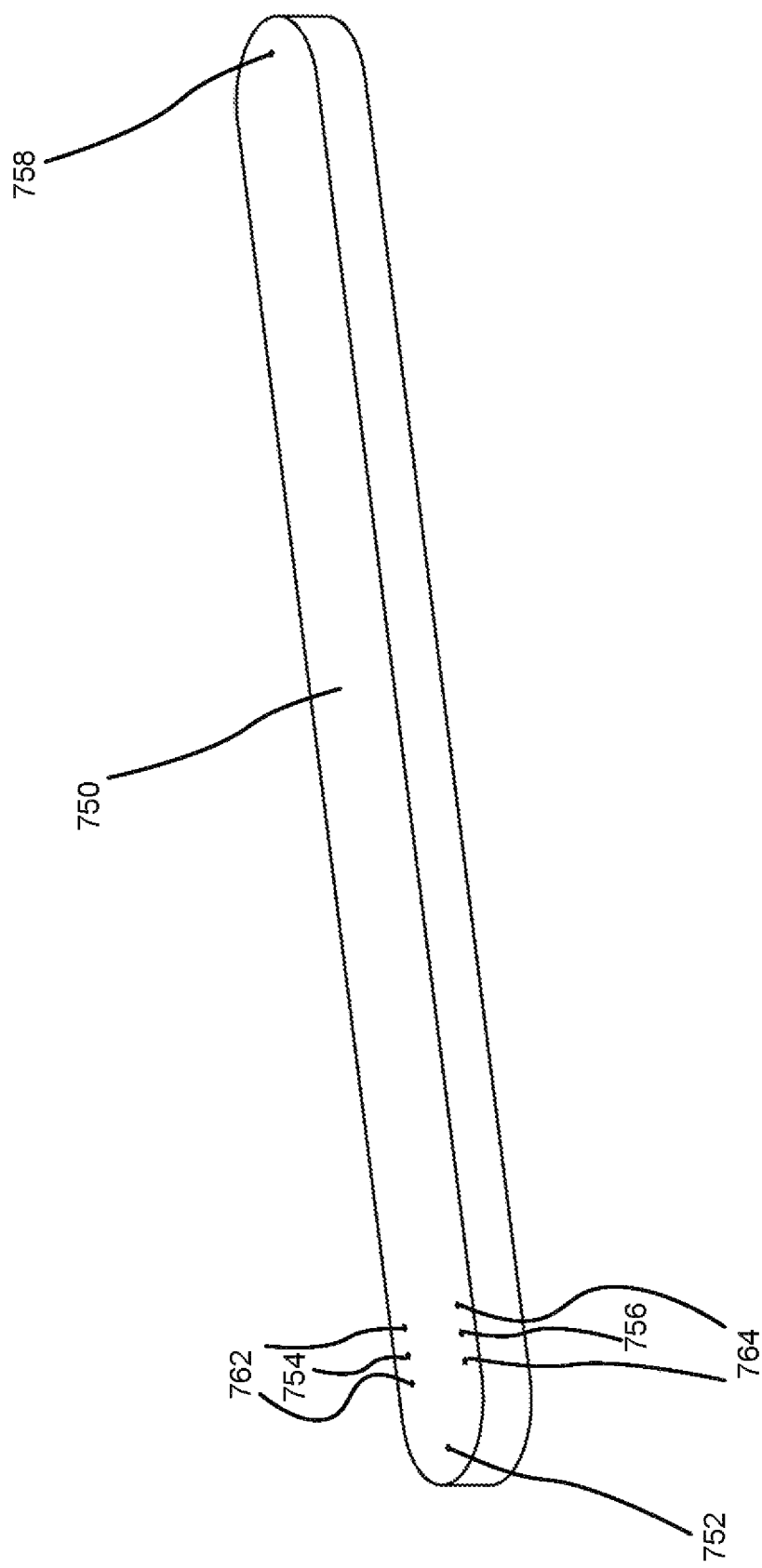
FIG. 7C depicts a top plate in accordance with an embodiment of the present invention.
Figure 7D:
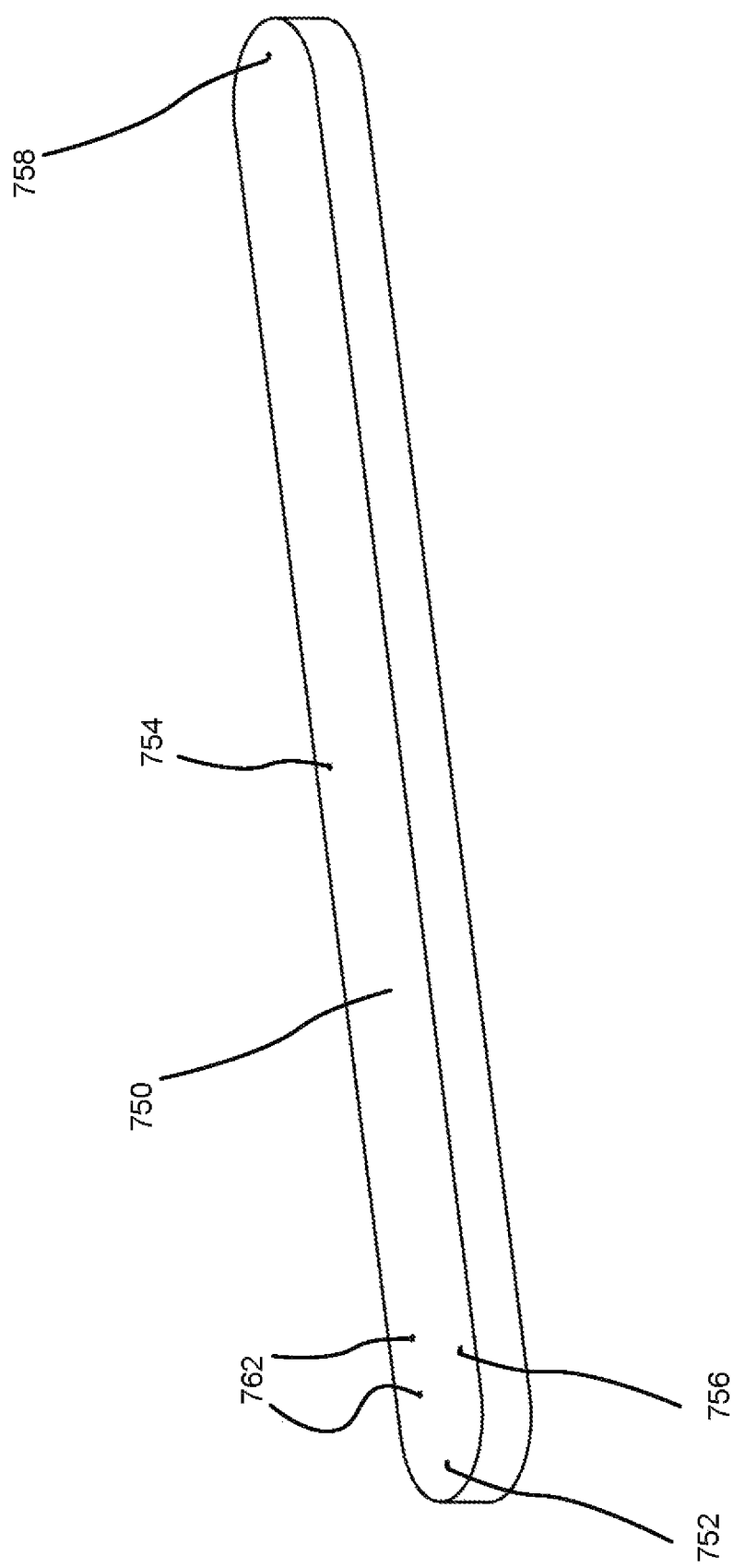
FIG. 7D depicts a top plate in accordance with an embodiment of the present invention.

Referring to FIG. 7A, FIG. 7B, FIG. 7C, and FIG. 7D, in a further embodiment, a top plate 750 further includes two sheath flow inlet ports 762 adjacent to opposite sides of a sample injection inlet port 754 and configured to allow two sheath flows to be injected into a separation channel 740. In a particular embodiment, spacer 730 further includes a sheath flow inlet cavity 758 configured to be in fluid contact with separation channel 740, located substantially beneath two sheath flow inlet ports 762, configured to deliver the two sheath flows from sheath flow inlet ports 762 to separation channel 740, and configured to allow the two sheath flows to confine the liquid borne sample substantially within an injection channel 742 via hydrodynamic focusing. In another embodiment, spacer 730 further includes two sheath flow inlet cavities 759 configured to be in fluid contact with separation channel 740, located substantially beneath two sheath flow inlet ports 762, configured to deliver the two sheath flows from sheath flow inlet ports 762 to separation channel 740, and configured to allow the two sheath flows to confine the liquid borne sample substantially within injection channel 742 via hydrodynamic focusing. In a particular embodiment, as shown in FIG. 7A and FIG. 7C, top plate 750 further includes two sheath flow outlet ports 764 adjacent to opposite sides of sample injection outlet port 756 and configured to allow the two sheath flows to be withdrawn from separation channel 740, and where spacer 730 further comprises two sheath flow outlet cavities 751 configured to be in fluid contact with separation channel 740, located substantially beneath two sheath flow outlet ports 764, and configured to deliver the two sheath flows from separation channel 740 to sheath flow outlet ports 764. In an embodiment, top plate 750 includes an injection port 752 and an exit port 755.

Pumping

In a further embodiment, field flow fractionation unit 400 further includes at least one sample injection pump configured to connect to sample injection inlet port 454, where the at least one sample injection pump is configured to inject the liquid borne sample into separation channel 440 two sheath flow pumps configured to connect to two sheath flow inlet ports 762, where the two sheath flow pumps are configured to inject the two sheath flows into separation channel 740.

Manifolds

In a further embodiment, field flow fractionation unit 400 further includes a top manifold including (a) a sample injection inlet opening configured to allow the liquid borne sample to be injected into sample injection inlet port 454 and (b) a sample injection outlet opening configured to allow the liquid contained within separation channel 440 to be withdrawn from sample injection outlet port 456. In a particular embodiment, the top manifold includes two sheath flow inlet openings configured to allow the two sheath flows to be injected into two sheath flow inlet ports 762, respectively. In a particular embodiment, the top manifold includes two sheath flow outlet openings configured to allow the two sheath flows to be withdrawn from two sheath flow outlet ports 764, respectively.

Method of Injecting

Figure 8:
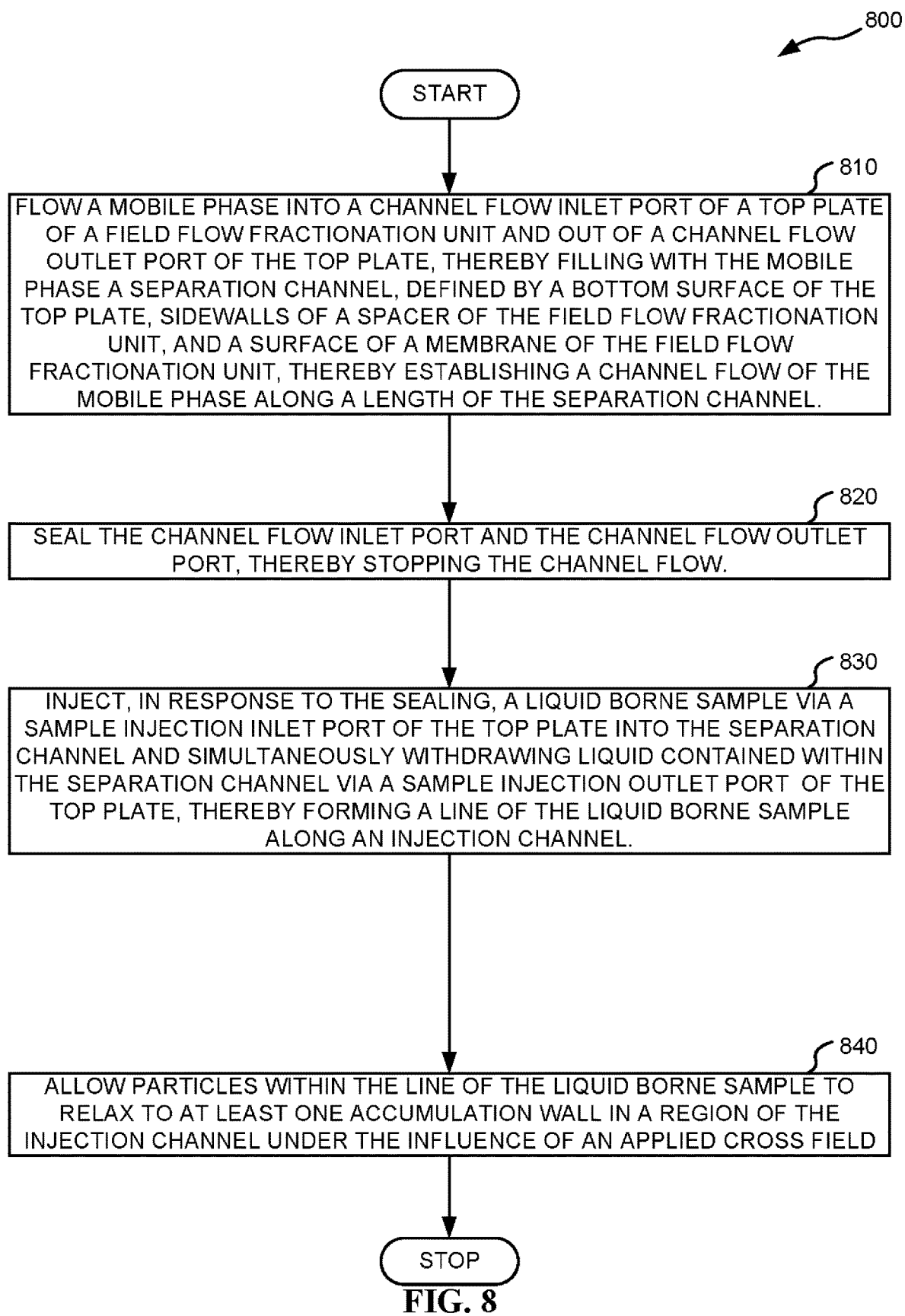
FIG. 8 depicts a flowchart in accordance with an embodiment of the present invention.

Referring to FIG. 8, in an exemplary embodiment, the present invention provides a method 800 of injecting a liquid borne sample into a field flow fractionator. In an exemplary embodiment, method 800 includes (1) a step 810 of flowing a mobile phase into a channel flow inlet port of a top plate of a field flow fractionation unit and out of a channel flow outlet port of the top plate, thereby filling with the mobile phase a separation channel, defined by a surface of the top plate, sidewalls of a spacer of the field flow fractionation unit, and a surface of a membrane of the field flow fractionation unit, thereby establishing a channel flow of the mobile phase along a length of the separation channel, (2) a step 820 of sealing the channel flow inlet port and the channel flow outlet port, thereby stopping the channel flow, and (3) a step 830 of injecting, in response to the sealing, a liquid borne sample via a sample injection inlet port of the top plate into the separation channel and simultaneously withdrawing liquid contained within the separation channel via a sample injection outlet port of the top plate, (a) where the spacer includes (i) a separation channel cavity defining at least a portion of the separation channel, (ii) a sample injection inlet cavity configured to be in fluid contact with the separation channel and located substantially beneath the sample injection inlet port, where the sample injection inlet cavity is configured to act as an injection inlet path, (iii) a sample injection outlet cavity configured to be in fluid contact with the separation channel and located substantially beneath the sample injection outlet port, where the sample injection outlet cavity is configured to act as an injection outlet path, (iv) where the sample injection inlet cavity is adjacent to a first sidewall of the separation channel cavity and the sample injection outlet cavity is adjacent to a second sidewall of the separation channel cavity, and (v) where the first sidewall is opposite across a width of the separation channel cavity from the second sidewall, such that the injection inlet path and the injection outlet path are configured to define an injection channel that is essentially perpendicular to the length of the separation channel and that spans the width of the separation channel cavity, thereby forming a line of the liquid borne sample along the injection channel, and (4) a step 840 of allowing particles within the line of the liquid borne sample to relax to at least one accumulation wall in a region of the injection channel under the influence of an applied cross field.

Cross Fields

In an embodiment, the applied cross field includes a fluid flow. In a particular embodiment, the applied cross field is a fluid flow. In a further embodiment, the method further includes sealing the sample injection inlet port and the sample injection outlet port, where the applied cross field includes at least one of a temperature gradient, a centrifugal force, and an electric field. In a particular embodiment, the method further includes sealing the sample injection inlet port and the sample injection outlet port, where the applied cross field is at least one of a temperature gradient, a centrifugal force, and an electric field.

Sheath Flows

In a further embodiment, the method further includes (a) introducing two sheath flows into the separation channel, via two sheath flow inlet ports of the top plate adjacent to opposite sides of the sample injection inlet port, prior to the injecting, while simultaneously withdrawing the liquid contained within the separation channel via the sample injection outlet port, (b) introducing the liquid borne sample into the separation channel via the sample injection port, wherein the liquid borne sample is confined substantially within the injection channel via hydrodynamic focusing resulting from the two introduced sheath flows, and (c) stopping introducing the two sheath flows once the injected liquid borne sample spans the breadth of the separation channel, prior to the unsealing. In a further embodiment, the method further includes withdrawing from the channel the two sheath flows via two sheath flow outlet ports of the top plate adjacent to opposite sides of the sample injection outlet port and via two sheath flow outlet cavities of the spacer in fluid contact with the separation channel and located substantially beneath the two sheath flow outlet ports.

Loop Injecting

In a further embodiment, the method further includes (a) introducing the borne liquid sample, via the sample injection inlet port, into the sample injection inlet cavity where the sample injection inlet cavity 780 is elongated as depicted in FIG. 7A, where the elongated sample injection inlet cavity is configured to allow particles within the liquid borne sample to relax to at least one accumulation wall in a region of the elongated sample injection inlet cavity while the liquid borne sample is injected into the sample injection inlet port, and (b) introducing the liquid borne sample from the elongated sample injection cavity into the separation channel by injecting a liquid into the sample injection inlet port while withdrawing the liquid from the sample injection outlet port.

Pumping

In a further embodiment, the method further includes injecting the liquid borne sample into the separation channel via at least one sample injection pump connected to the sample injection inlet port. In a particular embodiment, the introducing the two sheath flows includes introducing the two sheath flows into the separation channel via two sheath flow pumps connected to the two sheath flow inlet ports.

Method of Forming

Figure 9:
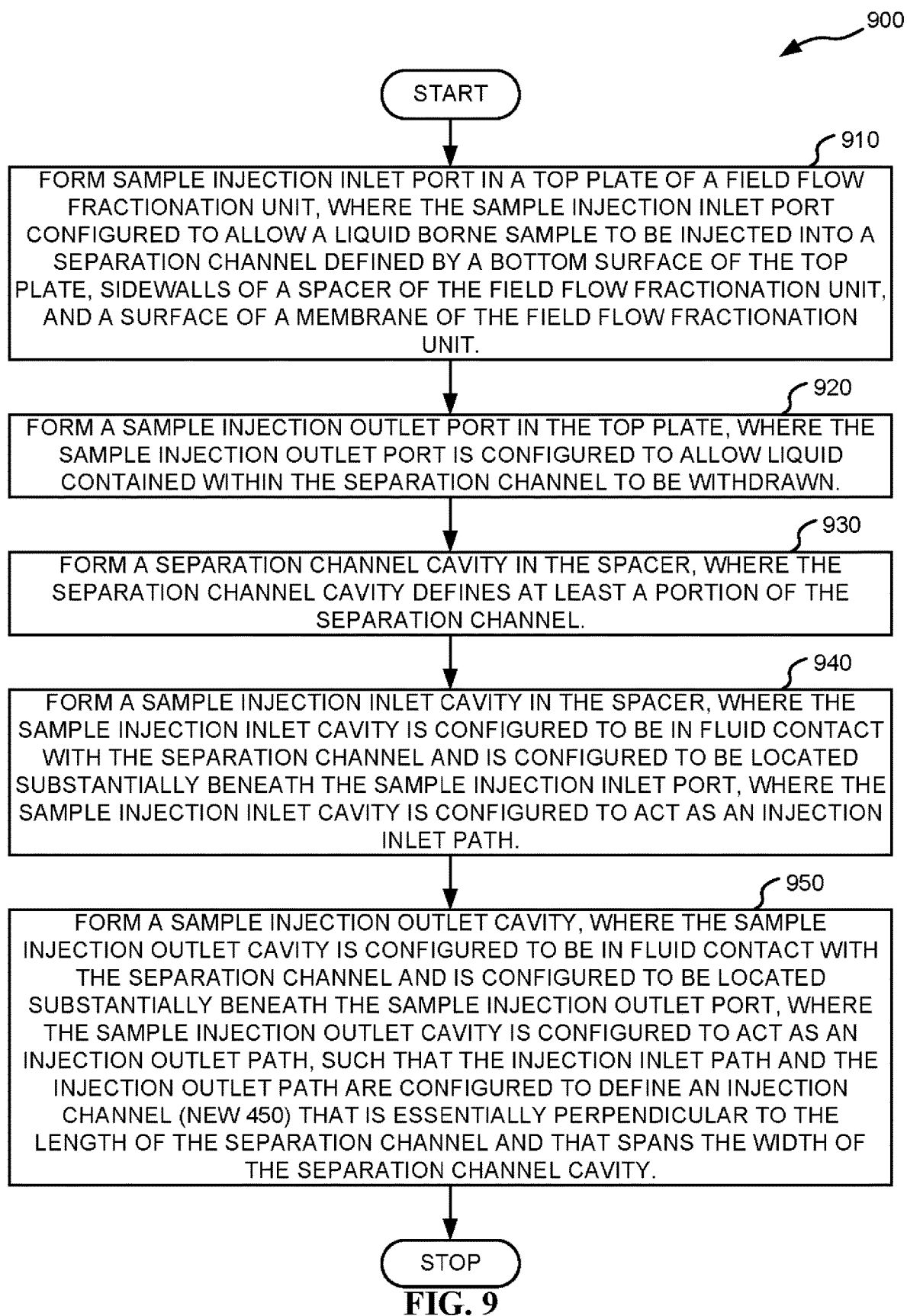
FIG. 9 depicts a flowchart in accordance with an embodiment of the present invention.

Referring to FIG. 9, in an exemplary embodiment, the present invention provides a method 900 of forming a top plate and spacer for injecting a liquid borne sample into a field flow fractionator. In an exemplary embodiment, method 900 includes (1) a step 910 of forming a sample injection inlet port in a top plate of a field flow fractionation unit, where the sample injection inlet port configured to allow a liquid borne sample to be injected into a separation channel defined by a bottom surface of the top plate, sidewalls of a spacer of the field flow fractionation unit, and a surface of a membrane of the field flow fractionation unit, (2) a step 920 of forming a sample injection outlet port in the top plate, where the sample injection outlet port is configured to allow liquid contained within the separation channel to be withdrawn, (3) a step 930 of forming a separation channel cavity in the spacer, where the separation channel cavity defines at least a portion of the separation channel, (4) a step 940 of forming a sample injection inlet cavity in the spacer, where the sample injection inlet cavity is configured to be in fluid contact with the separation channel and is configured to be located substantially beneath the sample injection inlet port, where the sample injection inlet cavity is configured to act as an injection inlet path, and (5) a step 950 of forming a sample injection outlet cavity, where the sample injection outlet cavity is configured to be in fluid contact with the separation channel and is configured to be located substantially beneath the sample injection outlet port, where the sample injection outlet cavity is configured to act as an injection outlet path, where the sample injection inlet cavity is adjacent to a first sidewall of the separation channel cavity and the sample injection outlet cavity is adjacent to a second sidewall of the separation channel cavity, and where the first sidewall is opposite across a width of the separation channel cavity from the second sidewall, such that the injection inlet path and the injection outlet path are configured to define an injection channel that is essentially perpendicular to the length of the separation channel and that spans the width of the separation channel cavity.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A field flow fractionation unit comprising:
   a top plate comprising:
      a sample injection inlet port configured to allow a liquid borne sample to be injected into a separation channel; and
      a sample injection outlet port configured to allow liquid contained within the separation channel to be withdrawn; and
   a spacer comprising
      a separation channel cavity defining at least a portion of the separation channel,
         wherein the separation channel is defined by a surface of the top plate, sidewalls of the spacer, and a surface of a membrane,
      a sample injection inlet cavity configured to be in fluid contact with the separation channel and located beneath the sample injection inlet port,
         wherein the sample injection inlet cavity is configured to act as an injection inlet path, and
      a sample injection outlet cavity configured to be in fluid contact with the separation channel and located beneath the sample injection outlet port,
         wherein the sample injection outlet cavity is configured to act as an injection outlet path,
      wherein the sample injection inlet cavity is adjacent to a first sidewall of the separation channel cavity and the sample injection outlet cavity is adjacent to a second sidewall of the separation channel cavity,
         wherein the first sidewall is opposite across a width of the separation channel cavity from the second sidewall, such that the injection inlet path and the injection outlet path are configured to define an injection channel that is essentially perpendicular to the length of the separation channel and that spans the width of the separation channel cavity.

2. The field flow fractionation unit of claim 1 wherein the top plate further comprises two sheath flow inlet ports adjacent to opposite sides of the sample injection inlet port and configured to allow two sheath flows to be injected into the separation channel.

3. The field flow fractionation unit of claim 2 wherein the spacer further comprises a sheath flow inlet cavity configured to be in fluid contact with the separation channel, located substantially beneath the two sheath flow inlet ports, configured to deliver the two sheath flows from the sheath flow inlet ports to the separation channel, and configured to allow the two sheath flows to confine the liquid borne sample substantially within the injection channel via hydrodynamic focusing.

4. The field flow fractionation unit of claim 2 wherein the spacer further comprises two sheath flow inlet cavities configured to be in fluid contact with the separation channel, located substantially beneath the two sheath flow inlet ports, configured to deliver the two sheath flows from the sheath flow inlet ports to the separation channel, and configured to allow the two sheath flows to confine the liquid borne sample substantially within the injection channel via hydrodynamic focusing.

5. The field flow fractionation unit of claim 2 wherein the top plate further comprises two sheath flow outlet ports adjacent to opposite sides of the sample injection outlet port and configured to allow the two sheath flows to be withdrawn from the separation channel, and
wherein the spacer further comprises two sheath flow outlet cavities configured to be in fluid contact with the separation channel, located substantially beneath the two sheath flow outlet ports, and configured to deliver the two sheath flows from the separation channel to the sheath flow outlet ports.

6. The field flow fractionation unit of claim 1 wherein the sample injection inlet cavity is elongated,
wherein the elongated sample injection inlet cavity is configured to allow particles within the liquid borne sample to relax to at least one accumulation wall in a region of the elongated sample injection inlet cavity while the liquid borne sample is injected into an elongated sample injection inlet port.

7. The field flow fractionation unit of claim 1 further comprising
a top manifold comprising:
 a sample injection inlet opening configured to allow the liquid borne sample to be injected into the sample injection inlet port and;
 a sample injection outlet opening configured to allow the liquid contained within the separation channel to be withdrawn from the sample injection outlet port.

8. A method comprising:
flowing a mobile phase into a channel flow inlet port of a top plate of a field flow fractionation unit and out of a channel flow outlet port of the top plate, thereby filling with the mobile phase a separation channel, defined by a surface of the top plate, sidewalls of a spacer of the field flow fractionation unit, and a surface of a membrane of the field flow fractionation unit, thereby establishing a channel flow of the mobile phase along a length of the separation channel;
sealing the channel flow inlet port and the channel flow outlet port, thereby stopping the channel flow; and
in response to the sealing, injecting a liquid borne sample via a sample injection inlet port of the top plate into the separation channel and simultaneously withdrawing liquid contained within the separation channel via a sample injection outlet port of the top plate,
wherein the spacer comprises;
 a separation channel cavity defining at least a portion of the separation channel,
 a sample injection inlet cavity configured to be in fluid contact with the separation channel and located beneath the sample injection inlet port, wherein the sample injection inlet cavity is configured to act as an injection inlet path, and
 a sample injection outlet cavity configured to be in fluid contact with the separation channel and located beneath the sample injection outlet port, wherein the sample injection outlet cavity is configured to act as an injection outlet path,
 wherein the sample injection inlet cavity is adjacent to a first sidewall of the separation channel cavity and the sample injection outlet cavity is adjacent to a second sidewall of the separation channel cavity, and
 wherein the first sidewall is opposite across a width of the separation channel cavity from the second sidewall, such that the injection inlet path and the injection outlet path are configured to define an injection channel that is essentially perpendicular to the length of the separation channel and that spans the width of the separation channel cavity,
thereby forming a line of the liquid borne sample along the injection channel; and
allowing particles within the line of the liquid borne sample to relax to at least one accumulation wall in a region of the injection channel under the influence of an applied cross field.

9. The method of claim 8 wherein the applied cross field comprises a fluid flow.

10. The method of claim 8 further comprising:
sealing the sample injection inlet port and the sample injection outlet port,
 wherein the applied cross field comprises at least one of a temperature gradient, a centrifugal force, and an electric field.

11. The method of claim 8 further comprising:
introducing two sheath flows into the separation channel, via two sheath flow inlet ports of the top plate adjacent to opposite sides of the sample injection inlet port, prior to the injecting, while simultaneously withdrawing the liquid contained within the separation channel via the sample injection outlet port;
introducing the liquid borne sample into the separation channel via the sample injection port, wherein the liquid borne sample is confined substantially within the injection channel via hydrodynamic focusing resulting from the two introduced sheath flows; and
stopping introducing the two sheath flows once the injected liquid borne sample spans the breadth of the separation channel, prior to the unsealing.

12. The method of claim 11 further comprising:
withdrawing from the channel the two sheath flows via two sheath flow outlet ports of the top plate adjacent to opposite sides of the sample injection outlet port and via two sheath flow outlet cavities of the spacer in fluid contact with the separation channel and located beneath the two sheath flow outlet ports.

13. The method of claim 8 further comprising:

introducing the borne liquid sample, via the sample injection inlet port, into the sample injection inlet cavity wherein the sample injection inlet cavity is elongated, wherein the elongated sample injection inlet cavity is configured to allow particles within the liquid borne sample to relax to at least one accumulation wall in a region of the elongated sample injection inlet cavity while the liquid borne sample is injected into the sample injection inlet port; and introducing the liquid borne sample from the elongated sample injection cavity into the separation channel by injecting a liquid into the sample injection inlet port while withdrawing the liquid from the sample injection outlet port.

14. A method comprising:

forming a sample injection inlet port in a top plate of a field flow fractionation unit,
　wherein the sample injection inlet port configured to allow a liquid borne sample to be injected into a separation channel defined by a surface of the top plate, sidewalls of a spacer of the field flow fractionation unit, and a surface of a membrane of the field flow fractionation unit;

forming a sample injection outlet port in the top plate,
　wherein the sample injection outlet port is configured to allow liquid contained within the separation channel to be withdrawn;

forming a separation channel cavity in the spacer,
　wherein the separation channel cavity defines at least a portion of the separation channel;

forming a sample injection inlet cavity in the spacer,
　wherein the sample injection inlet cavity is configured to be in fluid contact with the separation channel and is configured to be located beneath the sample injection inlet port,
　wherein the sample injection inlet cavity is configured to act as an injection inlet path; and forming a sample injection outlet cavity,
　wherein the sample injection outlet cavity is configured to be in fluid contact with the separation channel and is configured to be located beneath the sample injection outlet port,
　wherein the sample injection outlet cavity is configured to act as an injection outlet path,
　wherein the sample injection inlet cavity is adjacent to a first sidewall of the separation channel cavity and the sample injection outlet cavity is adjacent to a second sidewall of the separation channel cavity, and
　wherein the first sidewall is opposite across a width of the separation channel cavity from the second sidewall, such that the injection inlet path and the injection outlet path are configured to define an injection channel that is essentially perpendicular to the length of the separation channel and that spans the width of the separation channel cavity.

\* \* \* \* \*